United States Patent Office 3,257,425
Patented June 21, 1966

3,257,425
1-SUBSTITUTED-5,10-METHYLENE-19-NOR-3-KETO AND 3-SUBSTITUTED - 5,10 - SECO-5,19-CYCLO-$\Delta^{1(10),2,4}$-STEROIDS
Lawrence H. Knox, Mexico City, Mexico, assignor to Syntex Corporation, Panama, Panama, a corporation of Panama
No Drawing. Filed Feb. 20, 1964, Ser. No. 346,074
The portion of the term of the patent subsequent to May 18, 1982, has been disclaimed
25 Claims. (Cl. 260—397.3)

The present invention relates to a novel process for making certain cyclopentanoperhydrophenanthrene derivatives and to certain novel compounds obtained by this method.

More particularly, the present invention relates to a process for making 1α-alkyl, 1α-alkenyl, 1α-alkinyl and 1α-cyano-$\Delta^4$-3-keto-steroid compounds of the androstane and pregnane series starting from the corresponding 5,10-methylene-19-nor-$\Delta^1$-3-keto compounds, as well as to the novel 1-substituted 5,10-methylene-19-nor-3-keto and 3-substituted - 5,10-seco-5,19-cyclo-$\Delta^{1(10),2,4}$-steroid compounds, which are represented by the following formulas:

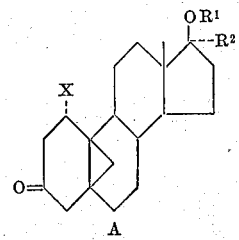

A

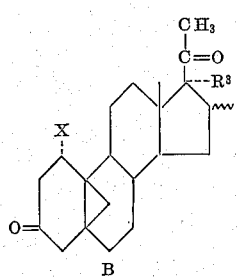

B

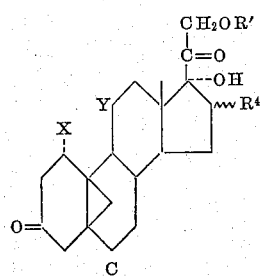

C

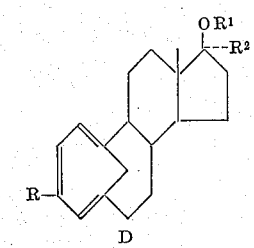

D

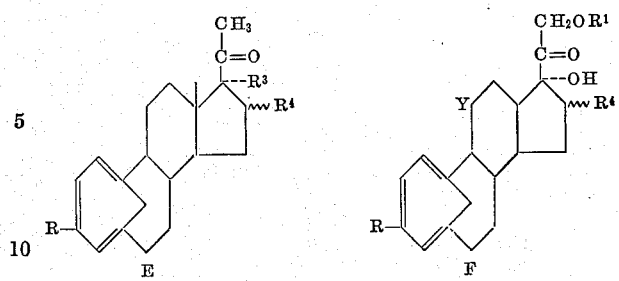

E                    F

Wherein X represents a cyano group, a lower alkyl, lower alkenyl or lower alkinyl radical such as methyl, ethyl, propyl, vinyl, ethinyl, propinyl, etc.; R represents lower alkyl, lower alkenyl or lower alkinyl; R' represents hydrogen or an acyl radical of less than 12 carbon atoms; $R^2$ represents hydrogen, lower alkyl, lower alkenyl or lower alkinyl; $R^3$ represents hydrogen, hydroxy or an acyloxy group of less than 12 carbon atoms; $R^4$ represents hydrogen, α-methyl or β-methyl and Y represents hydrogen, keto or β-hydroxy.

The acyl and acyloxy groups above referred to are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by A, B and C are valuable intermediates for making the corresponding 1-substituted $\Delta^4$-3-keto compounds; in addition, the compounds represented by A and D are anabolic-androgenic agents with a favorable anabolic-androgenic ratio, having antiestrogenic, anti-gonadotrophic, anti-fibrillatory and appetite stimulating properties. Furthermore, they lower the blood chloesterol level, relieve premenstrual tension and suppress the output of the pituitary gland. In addition, the compounds having a 17α-alkenyl or alkinyl group present certain progestational activity.

The compounds represented by B and E are powerful progestational agents with good oral activity. They have also anti-androgenic, anti-gonadotrophic and anti-estrogenic properties and are very useful in fertility control.

The compounds represented by C and F are valuable cortical hormones with high anti-inflammatory, low catabolic, glycogenic and thymolytic activities. In addition, they are anti-androgenic, anti-gonadotrophic and anti-estrogenic hormones.

The novel process for making 1-substituted $\Delta^4$-3-keto and 3-substituted - 5,10 - seco-5,19-cyclo-$\Delta^{1(10),2,4}$-steroid compounds of the androstane and pregnane series, which is one of the objects of the present invention is illustrated by the following sequence of reactions:

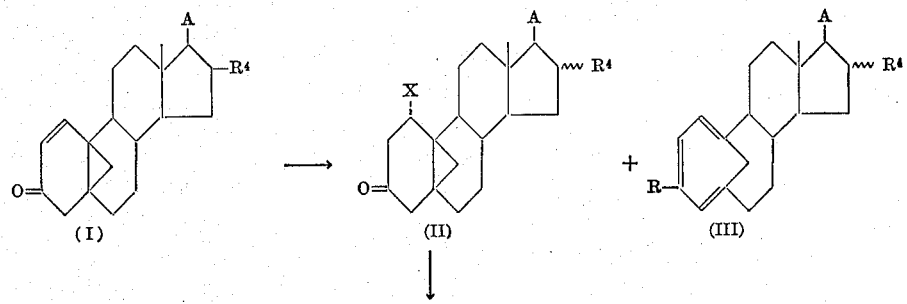

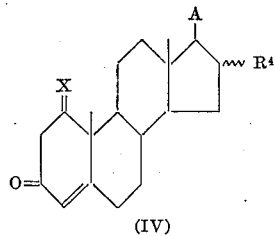

(IV)

In the above formulas, A represents a hydroxyl group, the grouping

wherein R[5] represents a lower alkyl, lower alkenyl or lower alkinyl group, an acetyl radical whose keto group may be protected in the starting materials as the cycloethylenedioxy derivative, and which may be further substituted at C-17α by a hydroxyl or acetoxy group; A may also represent the dihydroxyacetone side chain protected as the 17,20;20,21-bismethylenedioxy derivative; X and R have the same meaning as heretofore indicated. In the pregnane series, R[4] has also the same meaning as hereinbefore indicated.

In practicing the process outlined above, the starting materials, 5,10 - methylene-19-nor-$\Delta^1$-androsten-17β-ol-3-one, its 17 substituted derivatives, 20-ethylenedioxy-5-10-methylene - 19 - nor-$\Delta^1$-pregnen-3-one, 20-ethylenedioxy - 5,10 - methylene-19-nor-$\Delta^1$-pregnen-17α-ol-3-one, its acetate, 17,20;20,21 - bismethylenedioxy-5,10-methylene-19-nor-$\Delta^1$-pregnene-3-one or the 16-methyl derivatives of the pregnane compounds (I), (obtained by treatment of the corresponding 19-hydroxy-$\Delta^4$-3-keto compounds with 2-chloro-1,1,2-trifluoro-triethylamine or 1,1,2,2 - tetrafluoro - ethyldimethylamine in an inert organic solvent, as described in my copending patent application Serial No. 286,931 filed June 11, 1963), now U.S. Patent No. 3,184,484 are treated with a Grignard reagent such as methyl magnesium bromide, ethyl magnesium bromide, vinyl magnesium bromide, ethinyl magnesium bromide, propargyl magnesium bromide, etc., in an inert organic solvent such as ether, benzene, tetrahydrofuran and the like, at a temperature comprised between room temperature and reflux, for a period of time of between 1 to 6 hours, to produce a mixture of 1α-substituted-5,10-methylene-3-keto compounds (II, X=alkyl, alkenyl, alkinyl) and 3-substituted-5,10-seco-5,19-cyclo-$\Delta^{1(10),2,4}$-steroids (III), which is separated by chromatography.

Among the compounds obtained by such reaction there can be mentioned:

1α-methyl-5,10-methylene-19-nor-androstan-17β-ol-3-one,
1α-vinyl-5,10-methylene-19-nor-androstan-17β-ol-3-one,
1α-ethinyl-5,10-methylene-19-nor-androstan-17β-ol-3-one,
1α,17α-dimethyl-5,10-methylene-19-nor-androstan-17β-ol-3-one,
1α-methyl-17α-ethinyl-5,10-methylene-19-nor-androstan-17β-ol-3-one,
1α-methyl-20-ethylenedioxy-5,10-methylene-19-nor-pregnan-3-one,
1α-vinyl-20-ethylenedioxy-5,10-methylene-19-nor-pregnan-3-one,
1α-ethinyl-20-ethylenedioxy-5,10-methylene-19-nor-pregnan-3-one,
1α-methyl-17α-acetoxy-20-ethylenedioxy-5,10-methylene-19-nor-pregnan-3-one,
1α-methyl-17,20;20,21-bismethylenedioxy-5,10-methylene-19-nor-pregnan-3-one,
1α-vinyl-17,20;20,21-bismethylenedioxy-5,10-methylene-19-nor-pregnan-3-one,
3-methyl-5,10-seco-5,19-cyclo-$\Delta^{1(10),2,4}$-androstatrien-17β-ol,
3-vinyl-5,10-seco-5,19-cyclo-$\Delta^{1(10),2,4}$-androstatrien-17β-ol,
3-ethinyl-5,10-seco-5,19-cyclo-$\Delta^{1(10),2,4}$-androstatrien-17β-ol,
3,17α-dimethyl-5,10-seco-5,19-cyclo-$\Delta^{1(10),2,4}$-androstatrien-17β-ol,
3-methyl-17α-ethinyl-5,10-seco-5,19-cyclo-$\Delta^{1(10),2,4}$-androstatrien-17β-ol,
3-methyl-20-ethylenedioxy-5,10-seco-5,19-cyclo-$\Delta^{1(10),2,4}$-pregnatriene,
3-vinyl-20-ethylenedioxy-5,10-seco-5,19-cyclo-$\Delta^{1(10),2,4}$-pregnatriene,
3-ethinyl-20-ethylenedioxy-5,10-seco-5,19-cyclo-$\Delta^{1(10),2,4}$-pregnatriene,
3-methyl-20-ethylenedioxy-17α-acetoxy-5,10-seco-5,19-cyclo-$\Delta^{1(10),2,4}$-pregnatriene,
3-methyl-17,20;20,21-bismethylenedioxy-5,10-seco-5,19-cyclo-$\Delta^{1(10),2,4}$-pregnatriene,
3-vinyl-17,20;20,21-bismethylenedioxy-5,10-seco-5,19-cyclo-$\Delta^{1(10),2,4}$-pregnatriene, and
3-ethinyl-17,20;20,21-bismethylenedioxy-5,10-seco-5,19-cyclo-$\Delta^{1(10),2,4}$-pregnatriene.

In the case of the pregnane compounds whose 20-keto group is protected as the cycloethyleneketal, this protecting group may be hydrolyzed by conventional methods, preferably by treatment with p-toluenesulfonic acid in acetone solution, at room temperature for a period of time in the order of 4 hours.

Upon treatment of the 1α-substituted compounds (II, X=alkyl, alkenyl, alkinyl) with a mineral acid such as hydrochloric acid, sulfuric acid, perchloric acid, etc. in an alcoholic solvent such as for example using methanol, ethanol, propyl alcohol, t-butyl alcohol, etc., preferably at reflux temperature for about 1 to 5 hours, there are produced the corresponding $\Delta^4$-3-keto steroids (IV, X=alkyl, alkenyl, alkinyl), i.e. the 1α-alkyl, alkenyl and alkinyl derivatives of testosterone, 17α-substituted testosterone, progesterone, 17α-acetoxy progesterone, etc. In the case of the pregnane series, whose 20 keto group was protected in the starting materials as the cycloethyleneketal, this protecting group is also hydrolyzed by the acid treatment.

Alternatively, in order to obtain the 1α,17α-dialkyl, dialkenyl or dialkinyl substituted androstane compounds, there is used 5,10-methylene-19-nor-$\Delta^1$-androstene-3,17-dione as starting material, to give the 1α,17α-disubstituted 5,10-methylene 19-nor compounds and 3,17α-disubstituted 5,10-seco-5,19-cyclo-$\Delta^{1(10),2,4}$-steroids.

Upon reaction of the former with a mineral acid there are produced the corresponding 1α,17α-disubstituted-$\Delta^4$-3-keto-androstene derivatives.

By treatment of the abovementioned starting materials (I) with an alkali metal cyanide, preferably using potassium cyanide in ethanol solution, at reflux temperature for a period of time in the order of 3 hours, there are provided exclusively the 1α-cyano-5,10-methylene-19-nor-3-keto compounds (II, X=cyano) which by acid treatment, as described previously for the 1α-alkyl, alkenyl or alkinyl compounds, are converted into the corresponding 1α-cyano-Δ⁴-3-keto steroids (IV, X=cyano).

In this case, there can also be used as starting materials, 5,10-methylene - 19 - nor-Δ¹-pregnene-3,20-dione-5,10 - methylene - 19 - nor-Δ¹-pregnen-17α-ol-3,20-dione and the 16-methyl derivatives thereof, since it is not necessary to protect the 20-keto group.

The 1 substituted Δ⁴-3-keto compounds obtained by this method may be converted into the 1 dehydro derivatives by conventional methods, such as for example by dehydrogenation with selenium dioxide or 2,3-dichloro-5,6-dicyano-1,4-benzoquinone.

In the pregnane series, the bismethylenedioxy group is hydrolyzed by conventional methods, such as by reflux with 60% formic acid, to produce the corresponding compounds having the dihydroxy-acetone side chain of the corticoids; in addition, a hydroxyl group may be introduced at C-11 by incubation with adrenal glands, Curvularia lunata, etc.

Upon oxidation of the 11 hydroxylated compounds with chromic acid in aqueous acetic acid or with an 8 N solution of chromic acid in acetone, previous acetylation of the 21-hydroxy group, there are obtained the corresponding 11-keto compounds.

The compounds of the present invention having a primary or secondary hydroxyl group are conventionally esterified with acid anhydrides or chlorides of less than 12 carbon atoms in pyridine solution, to produce the corresponding acylates.

The compounds having a teritary hydroxyl group at C-17 are esterified with carboxylic acid anhydrides of the type described hereinbefore, in benzene solution and in the presence of p-toluenesulfonic acid.

The following specific examples serve to illustrate, but are not intended to limit the scope of the present invention.

PREPARATION I

A mixture of 10 g. of Δ⁵-pregnene-3β,19-diol-20-one, 250 cc. of dry benzene, 50 cc. of ethylene glycol and 500 mg. of p-toluenesulfonic acid monohydrate was refluxed for 16 hours using a water separator. It was then washed with a sodium bicarbonate solution, water and subsequently dried and evaporated to dryness. Recrystallization from acetonehexane yielded 20-ethylenedioxy-Δ⁵-pregnene-3β,19-diol.

A solution of 8 g. of the foregoing ketal in 80 cc. of toluene and 16 cc. of cyclohexanone was dried by distillation of 20 cc. of the solvent mixture; there was then added a solution of 2 g. of aluminum isopropoxide dissolved in 15 cc. of anhydrous toluene and 4 cc. of cyclohexanone and the mixture was refluxed for 10 minutes; there was added 8 cc. of acetic acid and the solvents were eliminated by steam distillation. The product was extracted several times with ethyl acetate and the organic extracts were washed with water to neutral, dried over anhydrous sodium sulfate and evaporated to dryness. By crystallization from acetonehexane there was obtained 20-ethylenedioxy-Δ⁴-pregnen-19-ol-3-one.

To a solution of 6 g. of the latter compound in 70 cc. of acetonitrile (distilled over phosphorous pentoxide) there was added 5 g. of 2-chloro-1,1,2-trifluorotriethylamine) N. M. Yarovenko et al., Journal of General Chemistry of the USSR, V 29, 1959 (1959) and the mixture was refluxed for 30 minutes; it was then evaporated to dryness under reduced pressure and the residue dissolved in hexane and chromatographed on 300 g. of Florisil. The fractions eluted with hexane-ether (7:3) gave 20-ethylenedioxy-5,10-methylene 19-nor-Δ¹-pregnen-3-one. Further elution with the same mixture of solvents gave 20-ethylenedioxy-5,10-seco-5,19-cyclo-10β-fluoro-Δ⁴-pregnen-3-one.

In a similar manner, the compounds mentioned below under I gave as final products the compounds set forth under II:

| I | II |
|---|---|
| 17-acetate of Δ⁵-pregnene-3β,17α,19-triol-20-one. | The acetate of 20-ethylenedioxy-5,10-methylene 19-nor-Δ¹-pregnen-17α-ol-3 one and the acetate of 20-ethylenedioxy-5,10-seco-5,19-cyclo-10β-fluoro-Δ⁴-pregnen-197α-ol-3-one. |
| 16α-methyl-Δ⁵-pregnene-3β,19-diol-20-one. | 16α-methyl-20-ethylenedioxy-5,10-methylene-19-nor-Δ¹-pregnen-3-one and 16α-methyl-20-ethylenedioxy-5,10-seco-5,19-cyclo-10β-fluoro-Δ⁴-pregnen-3-one. |
| 16β-methyl-Δ⁵-pregnene-3β,19-diol-20-one. | 16β-methyl-20-ethylenedioxy-5,10-methylene-19-nor-Δ¹-pregnen-3-one and 16β-methyl-20-ethylenedioxy-5,10-seco-5,19-cyclo-10β-fluoro-Δ⁴-pregnen-3-one. |
| 17-acetate of 16α-methyl-Δ⁵-pregnene-3β,17α,19-triol-20-one. | The acetate of 16α-methyl-20-ethylenedioxy-5,10-methylene-19-nor Δ¹-pregnen-17α-ol-3-one and the acetate of 16α-methyl-20-ethylenedioxy-5,10-seco-5,19-cyclo-10β-fluoro-Δ⁴-pregnen-17α-ol-3-one. |

PREPARATION II

To a solution of 2 g. of 16α-methyl-5,10-methylene-19-nor-Δ¹-pregnene-17α,21-diol-3,20-dione in 40 cc. of chloroform were added 16 cc. of 37% aqueous formaldehyde and 5 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 16α - methyl - 17,20;20,21 - bismethylenedioxy-5,10-methylene-19-nor-Δ¹-pregnen-3-one.

Example I

A solution of 2.2 g. of 5,10-methylene-9-nor-Δ¹-androsten-17β-ol-3-one in 95 cc. of ether was added dropwise over a 15 minute period, to 25 cc. of 4 N-methyl-magnesium bromide solution in ether, under stirring, and the reaction mixture was stirred at room temperature under anhydrous conditions for 4 hours further. After this time it was treated carefully with saturated sodium sulfate solution and solid sodium sulfate, the inorganic material was filtered off and washed well with ether, and the filterate evaporated to dryness. The residue was chromaographed on Florisil. The fraction eluted with hexane-ether (9:1) gave 3-methyl-5,10-seco-5,19-cyclo Δ¹⁽¹⁰⁾,²,⁴-androstatrien-17β-ol; M.P. 82–84° C.; [α]_D +97° (CHCl₃); λ max 215, 254 mμ; log ε 4.21, 3.67. The fractions eluted with hexane-ether (1:1) gave 1α-methyl-5,10-methylene - 19 - nor - androstan - 17β-ol-3-one, M.P. 164–165° C.: [α]_D −74° (CHCl₃).

Example II

A mixture of 500 mg. of 1α-methyl-5,10-methylene-19-nor-androstan-17β-ol-3-one, 150 cc. of ethanol and 5 cc. of concentrated hydrochloric acid was refluxed for 1 hour. It was then cooled, diluted with water and extracted with ether; the organic extract was washed with water, 5% sodium bicarbonate solution and water to neutral, dried over anhydrous sodium sulfate and evaporated to dryness. Crystallization of the residue from acetone-hexane gave the pure 1α-methyl testosterone; M.P. 142–143° C.

$\lambda_{max.}^{EtOH}$ 242–44 mμ log ε4.15

Example III

A solution of 5 g. of 5,10-methylene-19-nor-Δ¹-androsten-17β-ol-3-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness. The residue was chromatographed on 150 g. of Florisil, to produce 1α-methyl-5,10-methylene-19-nor-androstan-17β-ol-3-one and 3-methyl-5,10-seco-5,19-cyclo-$\Delta^{1(10),2,4}$-androstatrien 17β-ol-identical to the products obtained in Example I.

In a similar manner but using propylmagnesium bromide, propenylmagnesium bromide and propargylmagnesium bromide there were obtained respectively: 1α-propyl-5,10-methylene-19-nor-androstan-17β-ol-3-one and 3 - propyl - 5,10 - seco - 5,19 - cyclo-$\Delta^{1(10)2,4}$-androstatrien-17β - ol; 1a-propenyl-5,10-methylene-19-nor-androstan-17β-ol-3-one and 3-propenyl - 5,10-seco-5,19-cyclo-$\Delta^{1(10)2,4}$-androstatrien - 17β-ol; and 1α - propinyl-5,10-methylene-19-nor-androstan-17β-ol-3-one and 3-propinyl-5,10-seco-5,19-cyclo-$\Delta^{1(10)2,4}$-androstatrien-17β-ol.

Example IV

By following the method described in Example I, 5,10-methylene-19-nor-$\Delta^1$-androsten-17β-ol-3-one was treated with ethylmagnesium bromide, vinylmagnesium bromide and ethinylmagnesium bromide, to produce respectively: 1α - ethyl - 5,10 - methylene - 19 - nor - androstan - 17β-ol-3-one, and 3-ethyl-5,10-seco-5,19-cyclo-$\Delta^{1(10),2,4}$-androstatrien - 17β - ol; 1a - vinyl -5,10 - methylene - 19-nor - androstan - 17β - ol - 3 - one and 3 - vinyl - 5,10-seco - 5,19 - cyclo-$\Delta^{1(10),2,4}$ - androstatrien - 17β - ol; 1α-ethinyl - 5,10 - methylene - 19 - nor - androstan - 17β-ol - 3 - one, and 3 - ethinyl - 5,10 - seco - 5,19 - cyclo-$\Delta^{1(10),2,4}$-androstatrien-17β-ol.

Example V

A mixture of 1a-methyl-5,10-methylene-19-nor-androstan-17β-ol-one, 4 cc. of pyridine and 2 cc. of acetic anhydride was kept at room temperature overnight, poured into ice water, the formed precipitate was filtered, washed with water and dried. Crystallization from acetone-hexane gave the acetate of 1a-methyl-5,10-methylene-19-nor-androstan-17β-ol-3-one.

In a similar manner, 3-methyl-5,10-seco-5,19-cyclo-$\Delta^{1(10),2,4}$ - androstatrien - 17β - ol, 1a - ethyl - 5,10-methylene - 19 - nor - androstan - 17β - ol - 3 - one, 1a-propyl - 5,10 - methylene - 19 - nor - androstan - 17β-ol - 3 - one, 1α - vinyl - 5,10 - methylene - 19 - nor-androstan - 17β - ol - 3 - one, 1a - ethinyl - 5,10 - methylene - 19 - nor - androstan - 17β - ol - 3 - one, 3 - ethyl-5,10 - seco - 5,19 - cyclo-$\Delta^{1(10)2,4}$ - androstatrien - 17β-ol; 3 - propyl - 5,10 - seco - 5,19 - cyclo-$\Delta^{1(10),2,4}$ - androstatrien - 17β - ol; 3 - vinyl - 5,10 - seco - 5,19 - cyclo-$\Delta^{1(10),2,4}$ - androstatrien - 17β - ol, and 3 - ethinyl - 5,10-seco - 5,19 - cyclo-$\Delta^{1(10),2,4}$ - androstatrien - 17β - ol, were converted into the corresponding acetates.

Example VI

A solution of 500 mg. of 1α-methyl-5,10-methylene-19-nor-androstan-17β-ol-3-one, 150 cc. of methanol and 0.2 cc. of concentrated sulfuric acid was refluxed for 3 hours. It was then cooled, diluted with water and extracted with ether; the organic extract was washed to neutral, dried and evaporated to dryness. The residue was recrystallized from acetone-hexane, to produce 1α-methyl-testosterone, identical to the product obtained in Example II.

Example VII

In the method of the preceding example there was used 70% perchloric acid instead of sulfuric acid, to produce also 1α-methyl testosterone in similar yield.

Example VIII

By following the method described in Example II, the compounds below mentioned under I were converted into the products under II.

| I | II |
| --- | --- |
| 1α-ethyl-5,10-methylene-19-nor-androstan-17β-ol-3-one. | 1α-ethyl testosterone. |
| 1α-propyl-5,10-methylene-19-nor-androstan-17β-ol-3-one. | 1α-propyl testosterone. |
| 1α-vinyl-5,10-methylene-19-nor-androstan-17β-ol-3-one. | 1α-vinyl testosterone. |
| 1α-propenyl-5,10-methylene-19-nor-androstan-17β-ol-3-one. | 1α-propenyl testosterone. |
| 1α-ethinyl-5,10-methylene-19-nor-androstan-17β-ol-3-one. | 1α-ethinyl testosterone. |
| 1α-propinyl-5,10-methylene-19-nor-androstan-17β-ol-3-one. | 1α-propinyl testosterone. |

Example IX

The compounds obtained in the preceding example were esterified with acetic, propionic and cyclopentylpropionic anhydrides, to produce the respective esters.

Example X

A solution of 2 g. of 1α-methyl-testosterone in 8 cc. of pyridine was treated with 4 cc. of benzoyl chloride and then heated on the steam bath for 1 hour. The mixture was then poured into ice water and the formed precipitate collected, washed with water and dried. Recrystallization from methylene chloride-hexane afforded the benzoate of 1α-methyl testosterone.

Example XI

By following the method of Example III, 2 g. of 5,10-methylene-19-nor-$\Delta^1$-androstene-3,17-dione were reacted with 50 cc. of a 4 N methylmagnesium bromide solution in ether, thus producing a mixture of 1α,17α-dimethyl-5,10-methylene-19-nor-androstan-17β-ol-3-one and 3,17α-dimethyl-5,10-seco-5,19-cyclo - $\Delta^{1(10),2,4}$ - androstatrien-17β-ol which was separated by chromatography on 100 g. of neutral aluminna.

In a similar manner but using ethyl, vinyl and ethinyl magnesium bromide as reagents there were obtained respectively:

1α,17α-diethyl-5,10-methylene-19-nor-androstan - 17β - ol-3-one and 3,17α-diethyl-5,10-seco-5,19-cyclo-$\Delta^{1(10),2,4}$-androstatrien-17β-ol; 1α,17α-divinyl-5,10-methylene-19-nor-androstan-17β-ol-3-one and 3,17α-divinyl-5,10-seco-5,19-cyclo-$\Delta^{1(10)2,4}$-androstatrien-17β-ol; 1α,17a-diethinyl-5,10-methylene-19-nor-androstan-17β-ol-3-one and 3,17α-diethinyl-5,10-seco-5,19-cyclo-$\Delta^{1(10)2,4}$-androstatrien-17β-ol.

Example XII

In accordance with the method described in Example II, 1α,17α-dimethyl-5,10-methylene - 19 - nor - androstan-17β-ol-3-one, 1α,17a-diethyl-5,10-methylene-19-nor-androstan-17β-ol-3-one, 1α,17α-divinyl-5,10-methylene-19-nor-androstan-17β-ol-3-one, and 1α,17α-diethinyl-5,10-methylene-19-nor-androstan-17β-ol-3-one, were converted respectively into 1α,17α-dimethyl-testosterone, 1α,17α-diethyl testosterone, 1α,17α-divinyl-testosterone and 1α,17α-diethinyl testosterone.

Example XIII

To a solution of 500 mg. of 1α,17α-dimethyltestosterone in 10 cc. of anhydrous benzene there were added 0.1 g. of p-toluenesulfonic acid and 1 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 1α,17α-dimethyl-testosterone.

By the same method 1α,17α-dimethyl-5,10-methylene-19-nor-androstan-17β-ol-3-one, and 3,17α-dimethyl-5,10-seco-5,19-cyclo-Δ$^{1(10),2,4}$-androstatrien-17β-ol were converted into the corresponding acetates.

*Example XV*

By following the method of Example III, the compounds below mentioned under I were treated with the

| I | Reagent | I |
|---|---|---|
| 20-ethylenedioxy-5,10-methylene-19-nor-Δ$^1$-pregnen-3-one. | Ethylmagnesium bromide | 1α-ethyl-20-ethylenedioxy-5,10-methylene-19-nor-pregnan-3-one and 3-ethyl-20-ethylenedioxy-5,10-seco-5,19-cyclo-Δ$^{1(10)2,4}$-pregnatriene. |
| The acetate of 20 ethylenedioxy-5,10-methylene-19-nor-Δ$^1$-pregnen-17α-ol-3-one. | Propylmagnesium bromide | The acetate of 1α-propyl-20-ethylenedioxy-5,10-methylene-19-nor-pregnan-17α-ol-3-one and the acetate of 3-propyl-20-ethylenedioxy-5,10-seco-5,19-cyclo-Δ$^{1(10),2,4}$-pregnatrien-10α-ol- |
| 20-ethylenedioxy-5,10-methylene-19-nor-Δ$^1$-pregnen-3-one. | Vinylmagnesium bromide | 1α-vinyl-20-ethylenedioxy-5,10-methylene-19-nor-pregnan-3-one and 3-vinyl-20-ethylenedioxy-5,10-seco-5,19-cyclo-Δ$^{1(10),2,4}$-pregnatriene. |
| 20-ethylenedioxy-5,10-methylene-19-nor-Δ$^1$-pregnen-3-one. | Ethinylmagnesium bromide | 1α-ethinyl-20-ethylenedioxy-5,10-methylene-19-nor-pregnan-3-one and 3-ethinyl-20-ethylenedioxy-5,10-seco-5,19-cyclo-Δ$^{1(10),2,4}$-pregnatriene. |
| The acetate of 20-ethylenedioxy-5,10-methylene-19-nor-Δ$^1$-pregnen-17α-ol-3-one. | Vinylmagnesium bromide | The acetate of 1α-vinyl-20-ethylenedioxy-5,10-methylene-19-nor-pregnan-17α-ol-3-one and the acetate of 3-vinyl-20-ethylenedioxy-5,10-seco-5,19-cyclo-Δ$^{1(10),2,4}$-pregnatrien-17α-ol. |
| The acetate of 20-ethylenedioxy-5,10-methylene-19-nor-Δ$^1$-pregnen-17α-ol-3-one. | Propargylmagnesium bromide | The acetate of 1α-propinyl-20-ethylenedioxy-5,10-methylene-19-nor-pregnan-17α-ol-3-one and the acetate of 3-propinyl-20-ethylenedioxy-5,10-seco-5,19-cyclo-Δ$^{1(10)2,4}$-pregnatrien-17α-ol. |
| 17,20;20,21-bismethylenedioxy-5,10-methylene-19-nor-Δ$^1$-pregnen-3-one. | Methylmagnesium bromide | 1α-methyl-17,20;20,21-bismethylenedioxy-5,10-methylene-19-nor-pregnan-3-one and 3-methyl-17,20;20,21-bismethylenedioxy-5,10-seco-5,19-cyclo-Δ$^{1(10),2,4}$-pregnatriene. |
| 17,20;20,21-bismethylenedioxy-5,10-methylene-19-nor-Δ$^1$-pregnen-3-one. | Vinylmagnesium bromide | 1α-vinyl-17,20;20,21-bismethylenedioxy-5,10-methylene-19-nor-pregnan-3-one and 3-vinyl-17,20;20,21-bismethylenedioxy-5,10-seco-5,19-cyclo-Δ$^{1(10)2,4}$-pregnatriene. |
| 17,20;20,21-bismethylenedioxy-5,10-methylene-19-nor-Δ$^1$-pregnen-3-one. | Ethinylmagnesium bromide | 1α-ethinyl-17,20;20,21-bismethylenedioxy-5,10-methylene-19-nor-pregnan-3-one and 3-ethinyl-17,20;20,21-bismethylenedioxy-5,10-seco-5,19-cyclo-Δ$^{1(10)2,4}$-pregnatriene. |
| 16α-methyl-17,20;20,21-bismethylenedioxy-5,10-methylene-19-nor-Δ$^1$-pregnen-3-one. | Methylmagnesium bromide | 1α,16α-dimethyl-17,20;20,21-bismethylenedioxy-5,10-methylene-19-nor-pregnan-3-one and 3,16α-dimethyl-17,20;20,21-bismethylenedioxy-5,10-seco-5,19-cyclo-Δ$^{1(10),2,4}$-pregnatriene. |
| 16α-methyl-20-ethylenedioxy-5,10-methylene-19-nor-Δ$^1$-pregnen-3-one. | ----do---- | 1α,16α-dimethyl-20-ethylenedioxy-5,10-methylene-19-nor-pregnan-3-one and 3,16α-dimethyl-20-ethylenedioxy-5,10-seco-5,19-cyclo-Δ$^{1(10),2,4}$-pregnatriene. |
| 16α-methyl-20-ethylenedioxy-5,10-methylene-19-nor-Δ$^1$-pregnen-3-one. | Ethinylmagnesium bromide | 1α-ethinyl-16α-methyl-20-ethylenedioxy-5,10-methylene-19-nor-pregnan-3-one and 3-ethinyl-16α-methyl-20-ethylenedioxy-5,10-seco-5,19-cyclo-Δ$^{1(10)2,4}$-pregnatriene. |
| 16β-methyl-20-ethylenedioxy-5,10-methylene-19-nor-Δ$^1$-pregnen-3-one. | Ethylmagnesium bromide | 1α-ethyl-16β-methyl-20-ethylenedioxy-5,10-methylene-19-nor-pregnan-3-one and 3-ethyl-16β-methyl-20-ethylenedioxy-5,10-seco-5,19-cyclo-Δ$^{1(10)2,4}$-pregnatriene. |
| 16β-methyl-20-ethylenedioxy-5,10-methylene-19-nor-Δ$^1$-pregnen-3-one. | Vinylmagnesium bromide | 1α-vinyl-16β-methyl-20-ethylenedioxy-5,10-methylene-19-nor-pregnan-3-one and 3-vinyl-16β-methyl-20-ethylenedioxy-5,10-seco-5,19-cyclo-Δ$^{1(10),2,4}$-pregnatriene. |
| The acetate of 16α-methyl-20-ethylenedioxy-5,10-methylene-19-nor-Δ$^1$-pregnen-17α-ol-3-one. | Methylmagnesium bromide | The acetate of 1α,16α-dimethyl-20-ethylenedioxy-5,10-methylene-19-nor-pregnan-17α-ol-3-one and the acetate of 3,16α-dimethyl-20-ethylenedioxy-5,10-seco-5,19-cyclo-Δ$^{1(10),2,4}$-pregnatrien-17α-ol. |
| The acetate of 16α-methyl-20-ethylenedioxy-5,10-methylene-19-nor-Δ$^1$-pregnen-17α-ol-3-one. | Vinylmagnesium bromide | The acetate of 1α-vinyl-16α-methyl-20-ethylenedioxy-5,10-methylene-19-nor-pregnan-17α-ol-3-one and the acetate of 3-vinyl 16α-methyl-20-ethylenedioxy-5,10-seco-5,19-cyclo-Δ$^{1(10),2,4}$-pregnatrien-17α-ol. |

*Example XIV*

By following the method of Example III, 2 g. of 20-ethylenedioxy-5,10-methylene-19-nor - Δ$^1$ - pregnen-3-one were treated with methylmagnesium bromide in ether to produce a mixture of 1α-methyl-20-ethylenedioxy-5,10-methylene-19-nor-pregnan-3-one and 3-methyl-20-ethylenedioxy-5,10-seco-5,19 - cyclo - Δ$^{1(10),2,4}$ - pregnatriene, which was separated by chromatography on Florisil.

A solution of 750 mg. of 1α-methyl-20-ethylenedioxy-5,10-methylene-19-nor-pregnan-3-one in 100 cc. of ethanol and 0.5 cc. of 70% perchloric acid was refluxed for 1 hour. It was then poured into ice water, extracted with methylene chloride and the organic extract washed with water, 5% sodium bicarbonate solution and water to neutral, dried over anhydrous sodium sulfate and evaporated to dryness. Crystallization of the residue from acetone-ether gave the pure 1α-methyl progesterone.

In a similar manner starting from the acetate of 20-ethylenedioxy-5,10-methylene-19-nor - Δ$^1$ - pregnen - 17α-ol-3-one there were obtained, the acetate of 1α-methyl-20-ethylenedioxy-5,10-methylene - 19 - nor - pregnan - 17α-ol-3-one and the acetate of 3-methyl-20-ethylenedioxy-5,10-seco-5,19-cyclo-Δ$^{1(10),2,4}$-pregnatrien-17α-ol, by reaction with methylmagnesium bromide.

Upon acid treatment of the acetate of 1α-methyl-20-ethylenedioxy-5,10-methylene-19 - nor - pregnan-17α-ol-3-one there was produced 1α-methyl-17α-acetoxy-progesterone.

indicated Grignard reagent, to produce the compounds listed under II, which were separated by chromatography.

*Example XVI*

In accordance with the method described in Example II the compounds listed below under I were treated with hydrochloric acid in ethanol solution, thus affording the compounds under II:

| I | II |
|---|---|
| 1α-ethyl-20-ethylenedioxy-5,10-methylene-19-nor-pregnan-3-one. | 1α-ethyl-progesterone. |
| 1α-vinyl-20-ethylenedioxy-5,10-methylene-19-nor-pregnan-3-one. | 1α-vinyl progesterone. |
| 1α-ethinyl-20-ethylenedioxy-5,10-methylene-19-nor-pregnan-3-one. | 1α-ethinyl progesterone. |
| The acetate of 1α-propyl-20-ethylenedioxy-5,10-methylene-19-nor-pregnan-17α-ol-3-one. | 1α-propyl-17α-acetoxyprogesterone. |
| The acetate of 1α-vinyl-20-ethylenedioxy-5,10-methylene-19-nor-pregnan-17α-ol-3-one. | 1α-vinyl-17α-acetoxyprogesterone. |
| The acetate of 1α-propinyl-20-ethylenedioxy-5,10-methylene-19-nor-pregnan-17α-ol-3-one. | 1α-propinyl-17α-acetoxyprogesterone. |
| 1α-methyl-17,20;20,21-bismethylenedioxy-5,10-methylene-19-nor-pregnan-3-one. | 1α-methyl-17,20;20,21-bismethylenedioxy-Δ$^4$-pregnen-3-one. |
| 1α,16α-dimethyl-17,20;20,21-bismethylenedioxy-5,10-methylene-19-nor-pregnan-3-one. | 1α-16α-dimethyl-17,20;20,21-bismethylenedioxy-Δ$^4$-pregnen-3-one. |
| 1α-vinyl-17,20;20,21-bismethylenedioxy-5,10-methylene-19-nor-pregnan-3-one. | 1α-vinyl-17,20;20,21-bismethylenedioxy-Δ$^4$-pregnen-3-one. |
| 1α-ethinyl-17,20;20,21-bismethylenedioxy-5,10-methylene-19-nor-pregnan-3-one. | 1α-ethinyl-17,20;20,21-bismethylenedioxy-Δ$^4$-pregnen-3-one. |

| I | II |
|---|---|
| 1α,16α-dimethyl-20-ethylenedioxy-5,10-methylene-19-nor-pregnan-3-one. | 1α-16-dimethyl progesterone. |
| 1α-ethinyl-16α-methyl-20-ethylenedioxy-5,10-methylene-19-nor-pregnan-3-one. | 1α-ethinyl-16α-methyl pregesterone. |
| 1α-ethyl-16β-methyl-20-ethylenedioxy-5,10-methylene-19-nor-pregnan-3-one. | 1α-ethyl-16β-methyl progesterone. |
| 1α-vinyl-16β-methyl-20-ethylenedioxy-5,10-methylene-19-nor-pregnan-3-one. | 1α-vinyl-16β-methyl progesterone. |
| The acetate of 1α,16α-dimethyl-20-ethylenedioxy-5,10-methylene-19-nor-pregnan-17α-ol-3-one. | The acetate of 1α,16α-dimethyl-17α-hydroxy-progesterone. |
| The acetate of 1α-vinyl-16α-methyl-20-ethylenedioxy-5,10-methylene-19-nor-pregnan-17α-ol-3-one. | The acetate of 1α-vinyl-16α-methyl-17α-hydroxy-progesterone. |

*Example XVII*

A mixture of 2 g. 5,10-methylene-19-nor-Δ$^1$-androsten-17β-ol-3-one, 4 g. of potassium cyanide and 100 cc. of 95% ethanol was refluxed for 3 hours, cooled, diluted with water and the reaction product extracted with ethyl acetate. The extract was washed with water, dried over anhydrous sodium sulfate and evaporated to dryness. Crystallization of the residue from acetone-hexane gave 1α-cyano-5,10-methylene-19-nor-androstan-17β-ol-3-one.

By the same method, the compounds mentioned below under I were converted into the products listed under II:

| I | II |
|---|---|
| 17α-methyl-5,10-methylene-19-nor-Δ$^1$-androsten-17β-ol-3-one. | 1α-cyano-17α-methyl-5,10-methylene 19-nor-androstan-17β-ol-3-one. |
| 17α-vinyl-5,10-methylene-19-nor-Δ$^1$-androsten-17β-ol-3-one. | 1α-cyano-17α-vinyl-5,10-methylene-19-nor-androstan-17β-ol-3-one. |
| 17α-ethinyl-5,10-methylene-19-nor-Δ$^1$-androsten-17β-ol-3-one. | 1α-cyano-17α-ethinyl-5,10-methylene 19-nor-androstan-17β-ol-3-one. |
| 5,10-methylene-19-nor-Δ$^1$-pregnene-3,20-dione. | 1α-cyano-5,10-methylene-19-nor-pregnane-3,20-dione. |
| 17,20;20,21-bismethylenedioxy-5,10-methylene-19-nor-Δ$^1$-pregnen-3-one. | 1α-cyano-17,20;20,21-bis-methylenedioxy-5,10-methylene-19-nor-pregnan-3-one. |
| 16α-methyl-5,10-methylene-19-nor-Δ$^1$-pregnene-3,20-dione. | 1α-cyano-16α-methyl-5,10-methylene-19-nor-pregnane-3,20-dione. |
| The acetate of 5,10-methylene 19-nor-Δ$^1$-pregnen-17α,ol-3,20-dione. | The acetate of 1α-cyano-5,10-methylene-19-nor-pregnan-17α-ol-3,20-dione. |
| The acetate of 16α-methyl-5,10-methylene-19-nor-Δ$^1$-pregnen-17α-ol-3,20-dione. | The acetate of 1α-cyano-16α-methyl-5,10-methylene-19-nor-pregnan-17α-ol-3,20-dione. |

*Example XVIII*

The compounds obtained in the preceding example were treated with hydrochloric acid in ethanol solution, in accordance with the method of Example II, to produce respectively:

1α-cyano-testosterone,
1α-cyano-17α-methyl-testosterone,
1α-cyano-17α-vinyl-testosterone,
1α-cyano-17α-ethinyl-testosterone,
1α-cyano-progesterone,
1α-cyano-17,20;20,21-bismethylenedioxy-Δ$^4$-pregnen-3-one,
1α-cyano-16α-methyl-progesterone,
1α-cyano-17α-acetoxy-progesterone,
1α-cyano-16α-methyl-17α-acetoxy-progesterone.

*Example XIX*

A solution of 500 mg. of 1α-methyl-20-ethylenedioxy-5,10-methylene-19-nor-pregnan-3-one, in 30 cc. of acetone was treated with 50 mg. of p-toluenesulfonic acid, and the reaction mixture was kept at room temperature for 4 hours. It was then poured into ice water, extracted with ethyl acetate and the organic extract washed with water to neutral, dried and evaporated to dryness. Addition of ether gave 1α-methyl-5,10-methylene-19-nor-pregnane-3,20-dione.

In a similar manner, the acetate of

1α-methyl-20-ethylenedioxy-5,10-methylene-19-nor-pregnan-17α-ol-3-one,
1α-ethinyl-20-ethylenedioxy-5,10-methylene-19-nor-pregnan-3-one, the acetate of 1α,16α-dimethyl-20-ethylenedioxy-5,10-methylene-19-nor-pregnan-17α-ol-3-one,
3-methyl-20-ethylenedioxy-5,10-seco-5,19-cyclo-Δ$^{1(10),2,4}$-pregnatriene and
3-methyl-20-ethylenedioxy-17-acetoxy-5,10-seco-5,19-cyclo-Δ$^{1(10),2,4}$-pregnatriene were converted respectively into the acetate of 1α-methyl-5,10-methylene-19-nor-pregnan-17α-ol-3,20-dione,
1α-ethinyl-5,10-methylene-19-nor-pregnane-3,20-dione, the acetate of 1α,16α-dimethyl-5,10-methylene-19-nor-pregnan-17α-ol-3,20-dione,
3-methyl-5,10-seco-5,19-cyclo-Δ$^{1(10),2,4}$-pregnatrien-20-one and the acetate of 3-methyl-5,10-seco-5,19-cyclo-Δ$^{1(10),2,4}$-pregnatrien-17α-ol-20-one.

*Example XX*

A solution of 1 g. of 1α-methyl-17α-acetory-progesterone in 50 cc. of methanol was refluxed for 1 hour with 500 mg. of potassium hydroxide dissolved in 1 cc. of water; it was then poured into ice water, the precipitate collected, washed with water to neutral and dried, thus producing a crude compound which upon recrystallization from methylene-chloride-ether afforded 1α-methyl-17α-hydroxy progesterone.

By the same method,

1α-vinyl-17α-acetoxy-progesterone,
1α,16α-dimethyl-17α-acetoxy-progesterone,
1α-cyano-17α-acetoxy-progesterone, the acetate 1α-cyano-5,10-methylene-19-nor-pregnan-17α-ol-3,20-dione and the acetate of 1α,16α-dimethyl-5,10-methylene-19-nor-pregnan-17α-ol-3,20-dione were converted into the corresponding free compounds, namely, 1α-vinyl-17α-hydroxy-progesterone,
1α,16α-dimethyl-17α-hydroxy-progesterone,
1α-cyano-17α-hydroxy-progesterone,
1α-cyano-5,10-methylene-19-nor-pregnan-17α-ol-3,20-dione and
1,α16α-dimethyl-5,10-methylene-19-nor-pregnan-17α-ol-3,20-dione.

*Example XXI*

By following the method of Example XIII, the compounds obtained in the preceding example were esterified with propionic, caproic and cyclopentylpropionic anhydrides, to produce the corresponding 17 propionates, caproates and cyclopentylpropionates.

*Example XXII*

A mixture of 1 g. of 1α-methyl-17,20;20,21-bis-methylenedioxy-5,10-methylene-19-nor-pregnan-3-one and 20 cc. of 60% formic acid was heated on the steam bath for 1 hour, cooled, diluted with water and the formed precipitate collected by filtration, washed with water, dried and recrystallized from acetone hexane, to produce 1α-methyl - 5,10 - methylene-19-nor-pregnane-17α,21-diol-3,20-dione.

By the same method, the compounds listed below under I were converted into the products mentioned under II:

| I | II |
|---|---|
| 1α-vinyl-17,20;20,21-bismethylenedioxy-5,10-methylene-19-nor-pregnan-3-one. | 1α-vinyl-5,10,methylene-19-nor-pregnane-17α,21-diol-3,20-dione. |
| 1α-ethinyl-17,20;20,21-bismethylenedioxy-5,10-methylene-19-nor-pregnan-3-one. | 1α-ethinyl-5,10-methylene-19-nor-pregnane-17α,21-diol-3,20-dione. |
| 3-methyl-17,20;20,21-bismethylenedioxy-5,10-seco-5,19-cyclo-$\Delta^{1(10),2,4}$-pregnatriene. | 3-methyl-5,10-seco-5,19-cyclo-$\Delta^{1(10),2,4}$-pregnatrien-17α,21-diol-20-one. |
| 3-ethinyl-17,20;20,21-bismethylenedioxy-5,10-seco-5,19-cyclo-$\Delta^{1(10),2,4}$-pregnatriene. | 3-ethinyl-5,10-seco-5,19-cyclo-$\Delta^{1(10),2,4}$-pregnatrien-17α,21-diol-20-one. |
| 1α-cyano-17,20;20,21-bismethylenedioxy-5,10-methylene-19-nor-pregnan-3-one. | 1α-cyano-5,10-methylene-19-nor-pregnane-17α,21-diol-3,20-dione. |
| 1α-methyl-17,20;20,21-bismethylenedioxy-$\Delta^4$-pregnen-3-one. | 1α-methyl-$\Delta^4$-pregnene-17α,21-diol-3,20-dione. |
| 1α-vinyl-17,20;20,21-bismethylenedioxy-$\Delta^4$-pregnen-3-one. | 1α-vinyl-$\Delta^4$-pregnene-17α,21-diol-3,20-dione. |
| 1α,16α-dimethyl-17,20;20,21-bismethylenedioxy-$\Delta^4$-pregnen-3-one. | 1α,16α-dimethyl-$\Delta^4$-pregnene-17α,21-diol-3,20-dione. |
| 1α-ethinyl-17,20;20,21-bismethylenedioxy-$\Delta^4$-pregnen-3-one. | 1α-ethinyl-$\Delta^4$-pregnene-17α,21-diol-3,20-dione. |

Example XXIII

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5-Erlenmeyer flasks of 250 cc. capacity containing each 50 cc. of a culture medium of the following composition:

| | G. |
|---|---|
| Glucose | 20 |
| $(NH_4)_2HPO_4$ | 5 |
| or | |
| $NaNO_3$ | 3 |
| $K_2HPO_4$ | 1 |
| $MgSO_4.7H_2O$ | 0.2 |
| KCl | 0.5 |
| $ZnSO_4$ | Traces |
| $FeSO_4.7H_2O$ | Traces |

Distilled water to complete 1 lt.

The cultures were incubated under rotatory stirring for 72 hours at 25° C. The growth was homogenized for 1 minute in a Waring blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of 1α-methyl-5,10-methylene-19-nor-pregnane-17α,21-diol-3,20-dione, in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 4 g. of silica gel and eluted with methylene chloride-ether (9:1) to produce 1α-methyl-5,10-methylene-19-nor-pregnane-11β,17α,21-triol-3,20-dione.

In a similar manner, the rest of the compounds obtained in the preceding example were converted into the corresponding 11β-hydroxylated compounds, namely:

1α-vinyl-5,10-methylene-19-nor-pregnane-11β,17α,21-triol-3,20-dione

1α-ethinyl-5,10-methylene-19-nor-pregnane-11β,17α,21-triol-3,20-dione 3-methyl-5,10-seco-5,19-cyclo-$\Delta^{1(10),2,4}$-pregnatriene-11β,17α,21-triol-20-one 3-ethinyl-5,10-seco-5,19-cyclo-$\Delta^{1(10),2,4}$-pregnatriene-11β,17α,21-triol-20-one 1-cyano-5,10-methylene-19-nor-pregnane-11β,17α,21-triol-3,20-dione 1α-methyl-$\Delta^4$-pregnene-11β,17α,21-triol-3,20-dione 1α,16α-dimethyl-$\Delta^4$-pregnene-11β,17α,21-triol-3,20-dione 1α-vinyl-$\Delta^4$-pregnene-11β,17α,21-triol-3,20-dione and 1α-ethinyl-$\Delta^4$-pregnene-11β,17α,21-triol-3,20-dione

Example XXIV

By following the method of Example V, 500 mg. of 1α-methyl-5,10-methylene-19-nor-pregnane-11β,17α,21-triol-3,20-dione were converted into its 21-monoacetate.

The foregoing compound was dissolved in 10 cc. of acetone, cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording the 21-acetate of 1α-methyl-5,10-methylene-19-nor-pregnane-17α,21-diol-3,11,20-trione.

Example XXV

The preceding example was repeated but using

1α-ethinyl-5,10-methylene-19-nor-pregnene-11β,17α,21-triol-3,20-dione

1α-ethinyl-$\Delta^4$-pregnene-11β,17α,21-triol-3,20-dione and 3-methyl-5,10-seco-5,19-cyclo-$\Delta^{1(10),2,4}$-pregnatriene-11β,17α,21-triol-3,20-dione as starting materials. There were thus obtained as final products:

1α-ethinyl-5,10-methylene-19-nor-pregnane-17α,21-diol-3,11,20-trione-21-acetate

1α-ethinyl-$\Delta^4$-pregnene-17α,21-diol-3,11,20-trione-21-acetate and 3-methyl-5,10-seco-5,19-cyclo-$\Delta^{1(10),2,4}$-pregnatriene-17α,21-diol-3,11,20-trione 21-acetate respectively.

EXAMPLE XXVI

A mixture of 500 mg. of 1α-methyl testosterone, 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave the pure 1-methyl-$\Delta^{1,4}$-androstadien-17β-ol-3-one (1-methyl-1-dehydro testosterone).

By the same procedure, the compounds listed below under I were converted into the corresponding 1-dehydro derivatives (II):

| I | II |
|---|---|
| 1α-vinyl testosterone | 1-vinyl-$\Delta^{1,4}$-androstadien-17β-ol-3-one. |
| 1α-ethinyl-testosterone | 1-ethinyl-$\Delta^{1,4}$-androstadien-17β-ol-3-one. |
| 1α,17α-dimethyl-testosterone acetate. | 1,17α-dimethyl-$\Delta^{1,4}$-androstadien-17β-ol-3-one acetate. |
| 1α-methyl-progesterone | 1-methyl-$\Delta^1$-dehydro-progesterone. |
| 1α-propyl-17α-acetoxy-progesterone | 1-propyl 1-17α-acetoxy-$\Delta^1$-dehydro progesterone. |
| 1α,16α-dimethyl-progesterone | 1,16α-dimethyl-$\Delta^1$-dehydro-progesterone. |
| 1α-ethinyl-16α-methyl-progesterone | 1-ethinyl-16α-methyl-$\Delta^1$-dehydro-progesterone. |
| 1α-ethinyl-$\Delta^4$-pregnene-17α,21-diol-3,11,20-trione-21-acetate. | 1-ethinyl-$\Delta^{1,4}$-pregnadiene-17α,21-diol-3,11,21-trione-21-acetate. |

Example XXVII

By following the method of Example XIX, 3-ethinyl-20-ethylenedioxy-5,10-seco, 5,19-cyclo - $\Delta^{1(10)2,4}$ - pregnatriene, 3-propyl-20-ethylenedioxy-5,10-seco - 5,19 - cyclo- $\Delta^{1(10),2,4}$-pregnatrien-17α-ol-acetate and 3-vinyl-20-ethylenedioxy-5,10-seco-5,19-cyclo-$\Delta^{1(10),2,4}$ - pregnatriene were converted respectively into 3-ethinyl-5,10-seco-5,19-cyclo-$\Delta^{1(10),2,4}$-pregnatrien-20-one, 3 - propyl - 5,10 - seco - 5,19-cyclo-$\Delta^{1(10)2,4}$-pregnatrien-17α-ol-20-one acetate and 3-vinyl-5,10-seco-5,19-cyclo-$\Delta^{1(10),2,4}$-pregnatrien-20-one.

I claim:

1. A compound of the following formula:

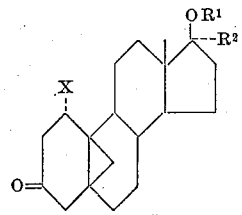

wherein X is selected from the group consisting of lower alkyl, lower alkenyl, lower alkinyl and cyano; $R^1$ is selected from the group consisting of hydrogen and a hydrocarbon carboxylic acyl radical of less than 12 carbon atoms and $R^2$ is selected from the group consisting of hydrogen, lower alkyl, lower alkenyl and lower alkinyl.

2. 1α-methyl-5,10-methylene-19-nor - androstan - 17β-ol-3-one.

3. 1α-cyano-5,10-methylene-19 - nor - androstan - 17β-ol-3-one.

4. 1α,17α-dimethyl-5,10-methylene - 19 - nor - androstan-17β-ol-3-one.

5. A compound of the following formula:

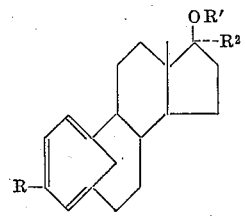

wherein R is selected from the group consisting of lower alkyl, lower alkenyl and lower alkinyl; $R^1$ is selected from the group consisting of hydrogen and a hydrocarbon carboxylic acyl radical of less than 12 carbon atoms; and $R^2$ is selected from the group consisting of hydrogen, lower alkyl, lower alkenyl and lower alkinyl.

6. 3-methyl-5,10 - seco - 5,19 - cyclo - $\Delta^{1(10),2,4}$ - androstatrien-17β-ol.

7. 3,17α-dimethyl - 5,10 - seco - 5,19 - cyclo - $\Delta^{1(10),2,4}$-androstatrien-17β-ol.

8. A compound of the following formula:

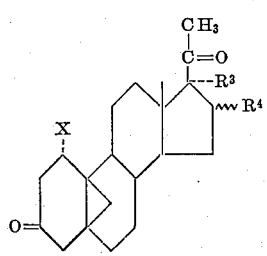

wherein X is selected from the group consisting of lower alkyl, lower alkenyl, lower alkinyl and cyano; $R^3$ is selected from the group consisting of hydrogen, hydroxy and an acyloxy group of less than 12 carbon atoms and $R^4$ is selected from the group consisting of hydrogen, α-methyl and β-methyl.

9. 1α-methyl-5,10-methylene - 19 - nor - pregnane-3,20-dione.

10. 1α-cyano-5,10-methylene-19 - nor - pregnane - 3,20-dione.

11. 1α-methyl-5,10-methylene - 19 - nor - pregnan-17α-ol-3-one-acetate.

12. A compound of the following formula:

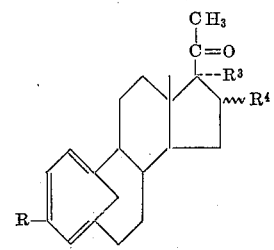

wherein R is selected from the group consisting of lower alkyl, lower alkenyl and lower alkinyl; $R^3$ is selected from the group consisting of hydrogen, hydroxy and an acyloxy group of less than 12 carbon atoms and $R^4$ is selected from the group consisting of hydrogen, α-methyl and β-methyl.

13. 3-methyl-5,10 - seco - 5,19 - cyclo - $\Delta^{1(10),2,4}$ - pregnatrien-20-one.

14. 3-methyl-5,10 - seco - 5,19 - cyclo - $\Delta^{1(10),2,4}$ - pregnatrien-17α-ol-20-one acetate.

15. A compound of the following formula:

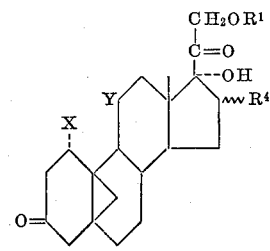

wherein $R^1$ is selected from the group consisting of hydrogen and a hydrocarbon carboxylic acyl radical of less than 12 carbon atoms; $R^4$ is selected from the group consisting of hydrogen, α-methyl and β-methyl, X is selected from the group consisting of lower alkyl, lower alkenyl, lower alkinyl and cyano and Y is selected from the group consisting of hydrogen, β-hydroxy and keto.

16. 1α-methyl - 5,10 - methylene - 19 - nor - pregnane-11β,17α,21-triol-3,20-dione.

17. 1α-cyano - 5,10 - methylene - 19 - nor - pregnane-17α,21-diol-3,20-dione.

18. A compound of the following formula:

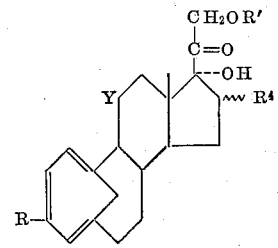

wherein R is selected from the group consisting of lower alkyl, lower alkenyl and lower alkinyl; $R^1$ is selected from the group consisting of hydrogen and a hydrocarbon carboxylic acyl radical of less than 12 carbon atoms; $R^4$ is selected from the group consisting of hydrogen, α-methyl and β-methyl; and Y is selected from the group consisting of hydrogen, β-hydroxy and keto.

19. 3 - methyl - 5,10 - seco - 5,19 - cyclo - $\Delta^{1(10),2,4}$-pregnatriene-11β,17α,21-triol-3,20-dione.

20. A process for making 1α-substituted $\Delta^4$-3-keto steroid compounds of the androstane and pregnane series, said substituent being selected from the group consisting of lower alkyl, lower alkenyl, lower alkinyl and cyano, which comprises treating the corresponding 5,10-methylene-19-nor-$\Delta^1$-3-keto compound with a reagent selected from the group consisting of hydrocarbon magnesium halide and alkali metal cyanides in an inert organic solvent, and thereafter subjecting the 1-substituted 5,10-methylene-19-nor-3-keto saturated compounds thus produced to treatment with a mineral acid in a lower aliphatic alcohol.

21. A process in accordance with claim 20 wherein the hydrocarbon magnesium halide is methyl magnesium bromide.

22. A process in accordance with claim 20 wherein the hydrocarbon magnesium halide is vinyl magnesium bromide.

23. A process in accordance with claim 20 wherein the hydrocarbon magnesium halide is ethinyl magnesium bromide.

24. A process in accordance with claim 20 wherein the alkali metal cyanide is potassium cyanide.

25. A process in accordance with claim 20 wherein the mineral acid is hydrochloric acid.

No references cited.

LEWIS GOTTS, *Primary Examiner.*

HENRY A. FRENCH, *Assistant Examiner.*